(12) United States Patent
Fandella (10) Patent No.: US 7,367,448 B2
(45) Date of Patent: May 6, 2008

(54) CHAIN WITH UNDULATED EDGE

(75) Inventor: Sergio Fandella, Mogliano Veneto (IT)

(73) Assignee: Habasit AG, Reinach (DE)

( * ) Notice: Subject to any disclaimer, the term of this patent is extended or adjusted under 35 U.S.C. 154(b) by 85 days.

(21) Appl. No.: 11/490,604

(22) Filed: Jul. 20, 2006

(65) Prior Publication Data

US 2008/0017482 A1    Jan. 24, 2008

(51) Int. Cl.
*B65G 17/06* (2006.01)

(52) U.S. Cl. .................................................. 198/853

(58) Field of Classification Search ................ 198/851, 198/852, 853
See application file for complete search history.

(56) References Cited

U.S. PATENT DOCUMENTS

| | | | |
|---|---|---|---|
| D231,633 S | 7/1972 | Totani | |
| D292,065 S | 9/1987 | Abbestam et al. | |
| 5,027,944 A * | 7/1991 | Damkjaer | 198/852 |
| 5,307,923 A | 5/1994 | Damkjaer | |
| 5,404,997 A * | 4/1995 | Schreier et al. | 198/779 |
| 5,489,020 A | 2/1996 | Clopton | |
| 5,628,393 A | 5/1997 | Steeber et al. | |
| 5,697,492 A | 12/1997 | Damkjaer | |
| 6,006,898 A | 12/1999 | Odink | |
| 6,068,112 A | 5/2000 | Kasai et al. | |
| 6,180,039 B1 | 1/2001 | Sanduja et al. | |
| 6,347,699 B1 | 2/2002 | Ramsey | |
| 6,471,047 B2 | 10/2002 | Shibayama et al. | |
| D486,289 S | 2/2004 | Abbestam et al. | |
| 6,736,259 B1 * | 5/2004 | Funabashi | 198/852 |
| RE38,543 E | 7/2004 | van Zijderveld | |
| 6,761,264 B2 | 7/2004 | Steeber et al. | |
| 6,871,736 B2 * | 3/2005 | Fandella | 198/853 |
| 6,918,486 B2 | 7/2005 | Shibayama et al. | |
| 7,044,290 B2 * | 5/2006 | Garbagnati et al. | 198/852 |

* cited by examiner

*Primary Examiner*—Mark A. Deuble
(74) *Attorney, Agent, or Firm*—Hodgson Russ LLP (57) ABSTRACT

A chain module with an undulating edge has an upper conveying surface having an opening for receiving a projecting portion of an adjacent chain module. The upper conveying surface has a top edge, a leading edge and a trailing edge. The leading edge has first and second portions separated by the opening. The trailing edge has first and second portions separated by the projecting portion. A curved portion extends from the top edge of the conveying surface to the leading edge. The leading edge and trailing edge have alternating peaks and valleys such that the peaks on the trailing edge align with the valleys on the leading edge of an adjacent chain module. A pair of opposed first hinge eyes extends from the upper conveying surface on opposite sides of the opening, each hinge eye having a transverse pivot rod opening. A second hinge eye is disposed in the projecting portion and also has a transverse pivot rod opening. The transverse pivot rod opening in the second hinge eye aligns with the transverse pivot rod openings in the first hinge eyes of an adjacent chain module for pivotally connecting adjacent modules to form a conveying chain.

23 Claims, 10 Drawing Sheets

CHAIN WITH UNDULATED EDGE

FIELD OF THE INVENTION

This invention relates to conveyor chains and more particularly to side-flexing chains designed to convey material along a track having arcuate sections.

BACKGROUND OF THE INVENTION

Plastic chains are widely used for the transport of bottles and cans at high speeds. It is also common to have chains running in parallel at different speeds and to transfer the goods (i.e., bottles, cans or the like) from one chain to the parallel running adjacent chain. Some of these chains are designed to be able to move straight as well as to negotiate a curve. The different speeds of the respective chains causes the goods to be accelerated or decelerated when the goods change from one chain to the next. During the changeover, the goods are shifting not only transversely, but also longitudinally over the chain surface. In order to prevent the goods, particularly bottles and the like, from tilting over, it is important for the chains to provide a smooth surface. This requirement becomes particularly important if a chain suitable for negotiating curves is used. An example of a chain for use with a curved track is shown in U.S. Pat. No. RE 38,543. The chain disclosed in this patent has convex front edges matching with the concave rear edge of the adjacent link module. The two mating edges need to have a small gap. When the chain is negotiating a curve, the gap becomes larger at the portion of the chain located on the outside of the curve. This is an important area for moving bottles or the like over these gaps without tilting.

There have been chains provided with finger-like overlapping of link plates as, for example, shown in U.S. Pat. Nos. 5,697,492 and 6,347,699. These chains however have the disadvantage of lengthening the gap line drastically and therefore increasing the unevenness of the surface for transversal movement over the chain surface.

Accordingly, there is a need for an improved chain module design that provides a smoother surface to reduce the risk of tilting bottles.

SUMMARY OF THE INVENTION

The present invention meets the above-described need by providing a chain module with an undulated edge. The chain module has an upper conveying surface extending from a first side edge to a second side edge. The upper conveying surface has an opening defined therein for receiving a projecting portion of an adjacent chain module. The opening extends to the bottom of the chain module and is capable of receiving the projecting portion of an adjacent module for pivotally connecting adjacent chain modules with a pivot rod. The upper conveying surface is bordered by a leading edge and a trailing edge. The leading edge has a first portion and a second portion separated by the opening. The trailing edge has a first portion and a second portion separated by the projecting portion. The projecting portion extends from the upper conveying surface to the bottom of the chain module. The module has a pair of opposed first hinge eyes extending from the upper conveying surface and disposed in spaced apart relation on opposite sides of the opening. Each hinge eye has a transverse pivot rod opening. A second hinge eye is disposed in the projecting portion and has a transverse pivot rod opening. The transverse pivot rod opening in the second hinge eye is capable of aligning with the transverse pivot rod openings in the first hinge eyes of an adjacent chain module. The leading edge and the trailing edge are defined by a plurality of alternating peaks and valleys. The peaks and valleys are offset such that the peaks on the trailing edge align with the valleys on the leading edge of an adjacent chain module such that gaps between adjacent chain modules are minimized when the chain negotiates a turn.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1:
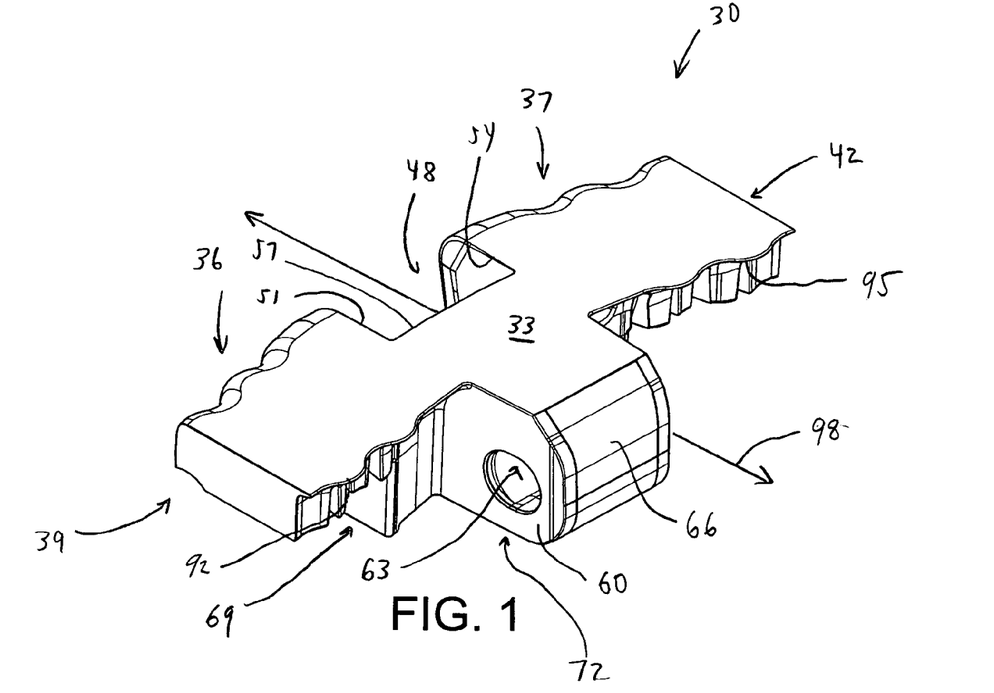
FIG. 1 is a perspective view of a chain module of the present invention.

In FIGS. 1-9, a chain module 30 of the present invention is shown. In FIG. 1, the chain module 30 has an upper conveying surface 33 that may be substantially smooth and generally planar. Leading or front edges 36, 37 of the module 30 extend from a first side edge 39 of the module 30 to a second side edge 42 of the module 30. From the first edge 39 toward the center of the module 30, the leading edge 36 is undulated. The undulation is created by a series of smooth gradual curves alternating between inward and outward curves with respect to a longitudinal axis 98 of the chain module 30. The curves may be sinusoidal. At the center of the module 30, the leading edge 36 terminates at an opening 48. The opening 48 is shaped to receive the projecting portion of an adjacent module 30 when the modules 30 are connected to form a chain as described in greater detail herein. The opening 48 is formed by a pair of side walls 51 and 54 connected by an end wall 57. The walls 51, 54, and 57 may be straight as shown in FIG. 1. Side wall 54 extends to leading edge 37 which is undulated as described above and extends to the second side edge 42.

A second hinge eye 60 extends in the direction of axis 45 and has a transverse opening 63 defined therein. The second hinge eye 60 is sized to fit inside the opening 48 when adjacent chain modules 30 are connected to form a chain (as shown and described in connection with FIGS. 10-23. The second hinge eye 60 contains a portion of upper conveying surface 33, and also includes a rounded surface 66 that extends to the bottom 69 of the module 30. A lower portion 72 of hinge eye 60 is coextensive with the bottom of the module 30.

Figure 2:
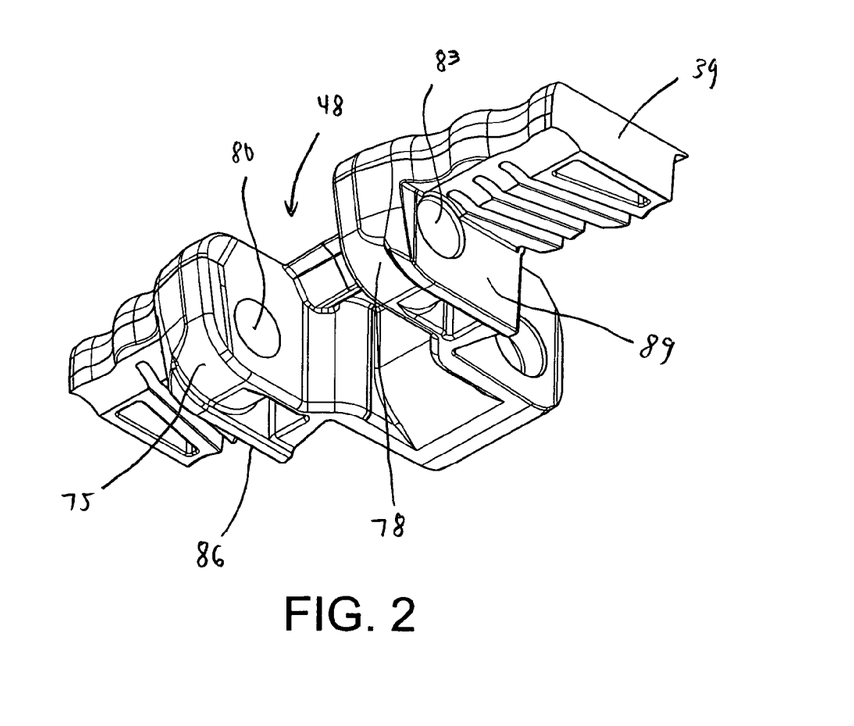
FIG. 2 is another perspective view of the chain module of the present invention.

Turning to FIG. 2, first hinge eyes 75 and 78 are shown. The first hinge eyes 75 and 78 include transverse openings 80 and 83. The transverse openings 80 and 83 receive a pivot pin which passes through openings 80, 83 and opening 63 in the adjacent module 30 as will be described in greater detail herein. The hinge eyes 75 and 78 also include guide surfaces 86 and 89 that extend generally perpendicular to the top surface 33. The guide surfaces 86 and 89 may be used to guide the chain through a U-shaped track (not shown) as known to those of ordinary skill in the art based on this disclosure.

Returning to FIG. 1, a trailing edge 92 extends from side 39 toward the center of the module. The trailing edge 92 is undulated such that it mates with the undulated leading edge 36 of the adjacent module. The surfaces mate such that the outward curved sections or peaks of the trailing edge 92 fit into the corresponding spaces or valleys created by the inward curved sections on the leading edge 36. The trailing edge 92 extends inward toward the center of the module to a point where it terminates at the second hinge eye 60. On the other side of the second hinge eye 60, a trailing edge 95 extends toward the opposite side 42 of the module. The trailing edge 95 is also undulated such that it mates with the leading edge 37 on an adjacent module 30 when the modules are connected by pivot pins as shown in FIGS. 10-23.

Figure 3:
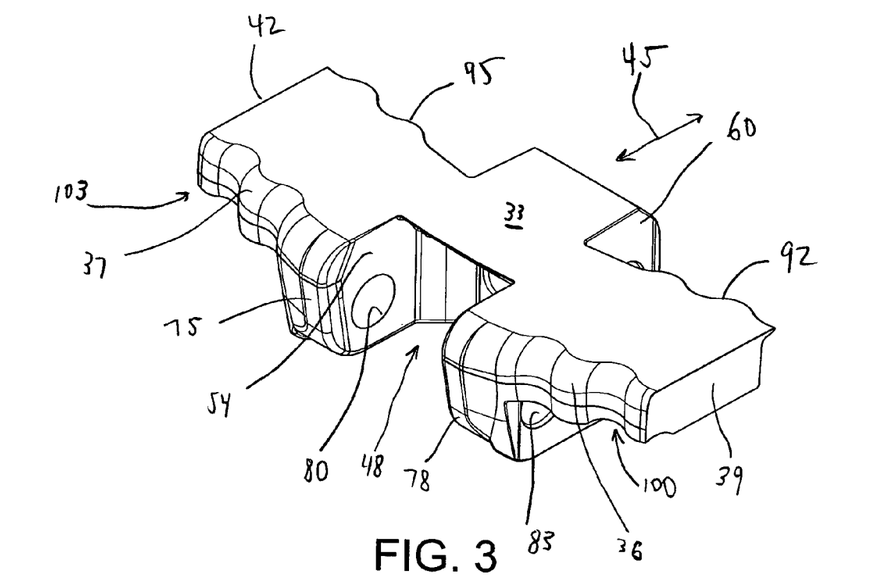
FIG. 3 is another perspective view of the chain module of the present invention.

Turning to FIG. 3, transverse opening 80 is formed in side wall 54 and extends transverse to the direction of travel indicated by arrow 45. The leading edges 36 and 37 are shown in greater detail in the figure. From the side 39 of the module 30 toward opening 48, the leading edge 36 is formed by a series of curves. From right to left with respect to FIG. 3, the leading edge 36 is formed in serpentine fashion by a series of alternating, gradual inward and outward curves. The curves form a plurality of alternating peaks and valleys. The trailing edges 92 and 95 have corresponding peaks and valleys as described herein.

At the front of the module 30, first hinge eyes 75 and 78 extend downward from the top surface 33 in spaced apart relation. The space 48 defined between the first hinge eyes 75 and 78 extends from the top surface 33 to the bottom surface 69 of the chain module. The module 30 includes cantilevered "wings" 100 and 103 that extend outward from the first hinge eyes 75 and 78. The wings 100 and 103 connect to a central portion consisting primarily of the top surface 33 of the second hinge eye 60.

Figure 4:
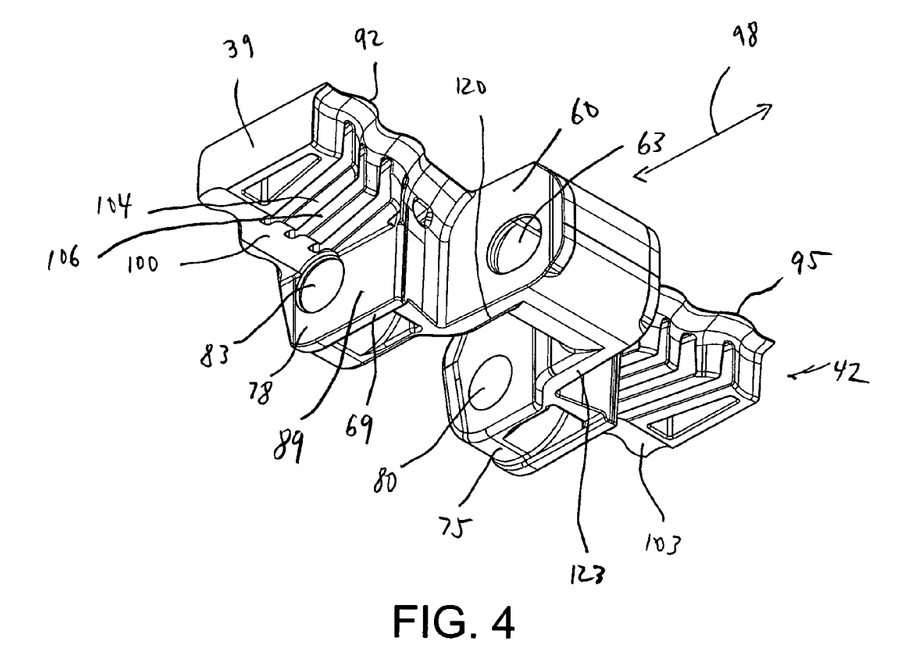
FIG. 4 is another perspective view of the chain module of the present invention.
Figure 6:
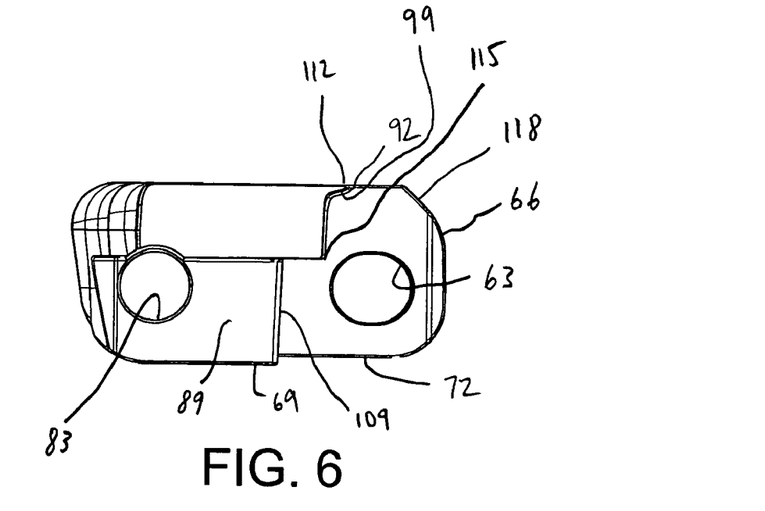
FIG. 6 is a side elevational view of the chain module of the present invention.

Turning to FIG. 4, the wing 100 is shown from underneath such that the portion from the side edge 39 to the hinge eye 78 is best shown. The bottom surface of the wing 100 includes a plurality of spaced apart ribs 104 having spaces 106 defined therebetween. The ribs 104 extend from the side edge 39 to the guiding surface 89 of the hinge eye 78. The guiding surface 89 may be used to guide the module inside a U-shaped channel as will be evident to those of ordinary skill in the art based on this disclosure. The guiding surface 89 extends in the direction of axis 98 for a portion of the module 30. As best shown in FIG. 6, the guiding surface 89 terminates at a midportion of the module 30 and the edge 109 of the guiding surface 89 is spaced apart from the top and bottom edges 112, 115 of the wing 100.

The second hinge eye 60 has the transverse opening 63 defined therein. The second hinge eye 60 has a substantially planar top surface that terminates at an angled wall 118 that extends to a curved section 66. The curved section 66 extends to the bottom wall 72. The second hinge eye 60 is connected to the first hinge eyes 75, 78 by a pair of spaced apart members 120, 123 as will be described in greater detail herein.

As shown, the bottom of wing 103 also has a plurality of ribs and spaces defined between the ribs. The ribs extend towards the side edge 42 of the module 30.

Figure 5:
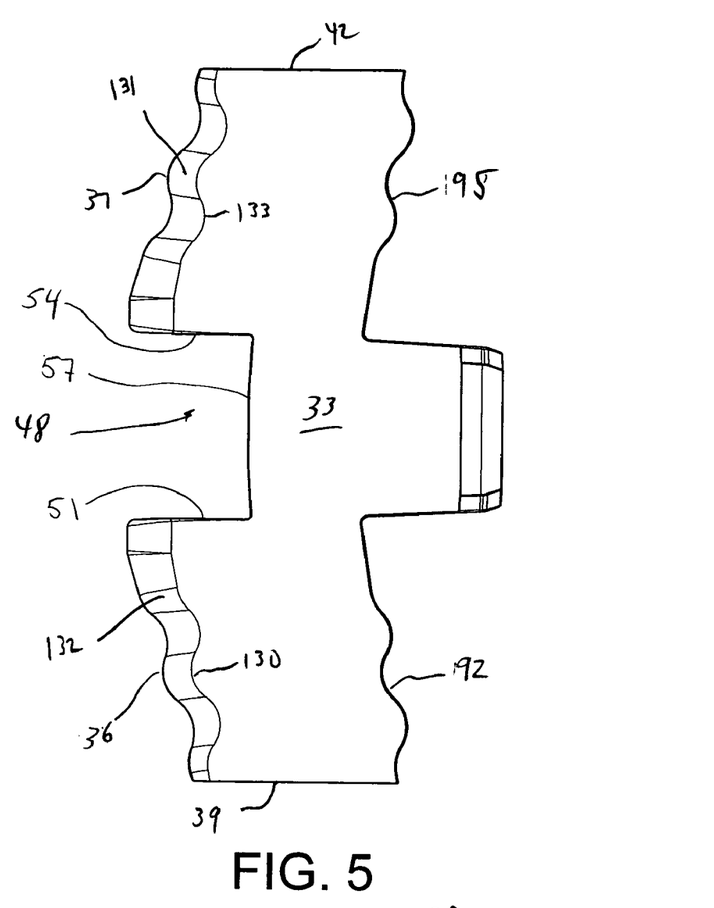
FIG. 5 is a top plan view of the chain module of the present invention.

Turning to FIG. 5, the top surface 33 borders opening 48 and extends from one side edge 39 to the opposite side edge 42 of the module 30. The top surface 33 is rounded from top edges 130 and 133 that are spaced apart from the leading edges 36 and 37 of the module 30. The top of the module 30 has curved portions 131, 132 from top edge 130 to leading edge 36 and from top edge 133 to leading edge 37. As shown, the trailing edge 92 is coplanar with the top surface 33 and the underside of the trailing edge 92 has a curved portion 99 as best shown in FIG. 6. Accordingly, when the modules 30 are connected as described herein, the leading edges 36 and 37 of an adjacent module 30 are capable of nesting underneath the trailing edges 92, 95 of the adjacent module to form a substantially level conveying surface.

Figure 7:
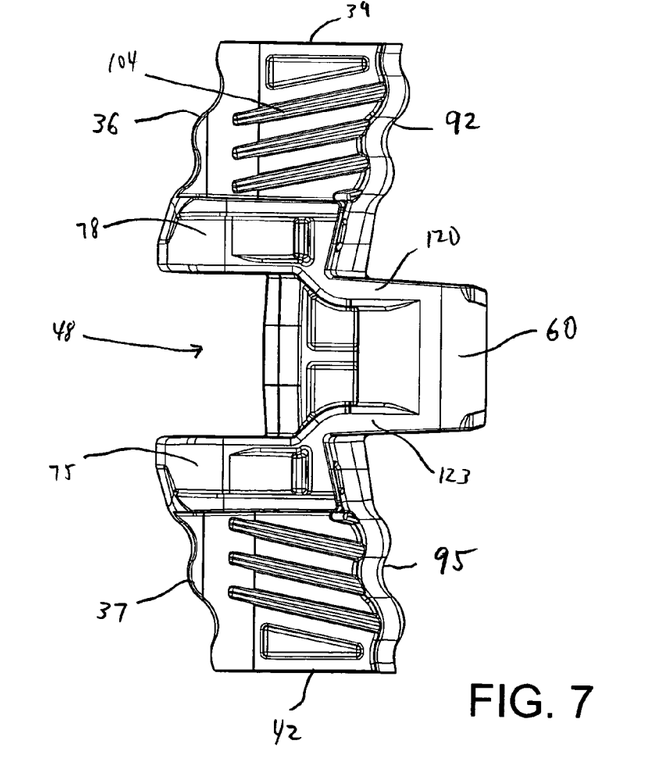
FIG. 7 is a bottom plan view of the chain module of the present invention.
Figure 8:
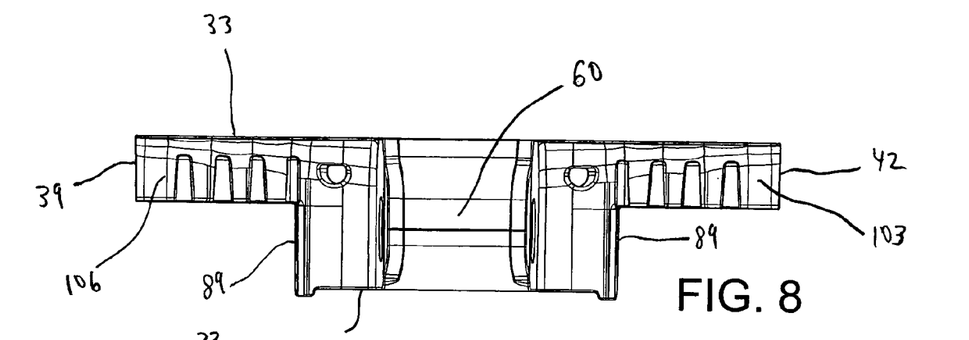
FIG. 8 is a rear elevational view of the chain module of the present invention.
Figure 9:
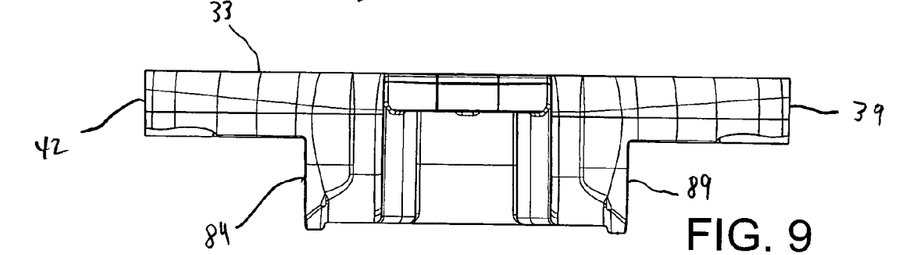
FIG. 9 is a front elevational view of the chain module of the present invention.
Figure 10:
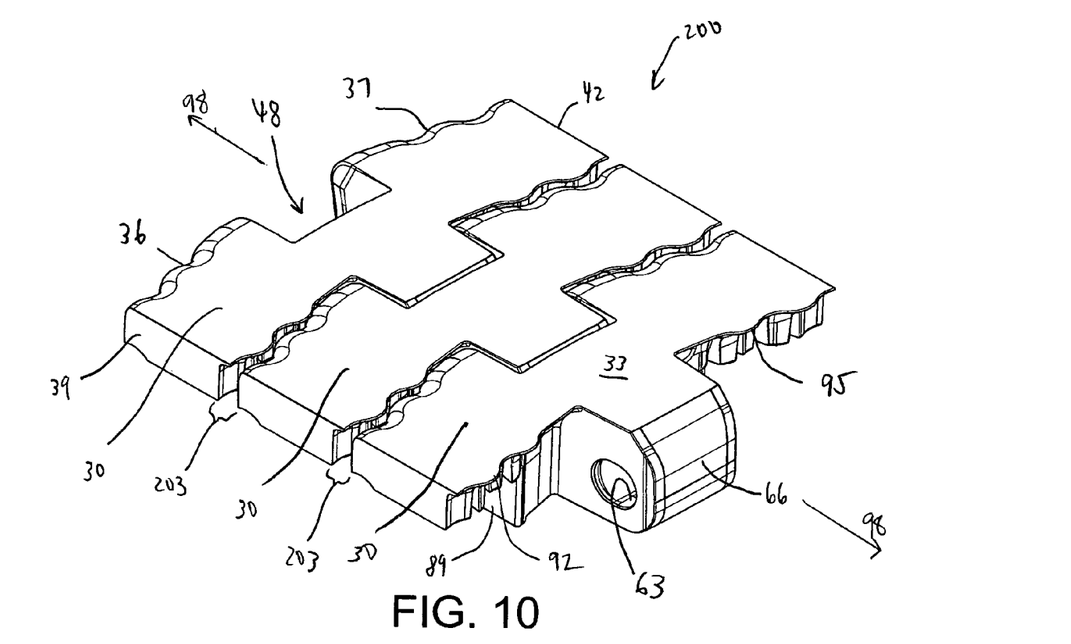
FIG. 10 is a perspective view of a portion of a straight running chain of the present invention.
Figure 11:
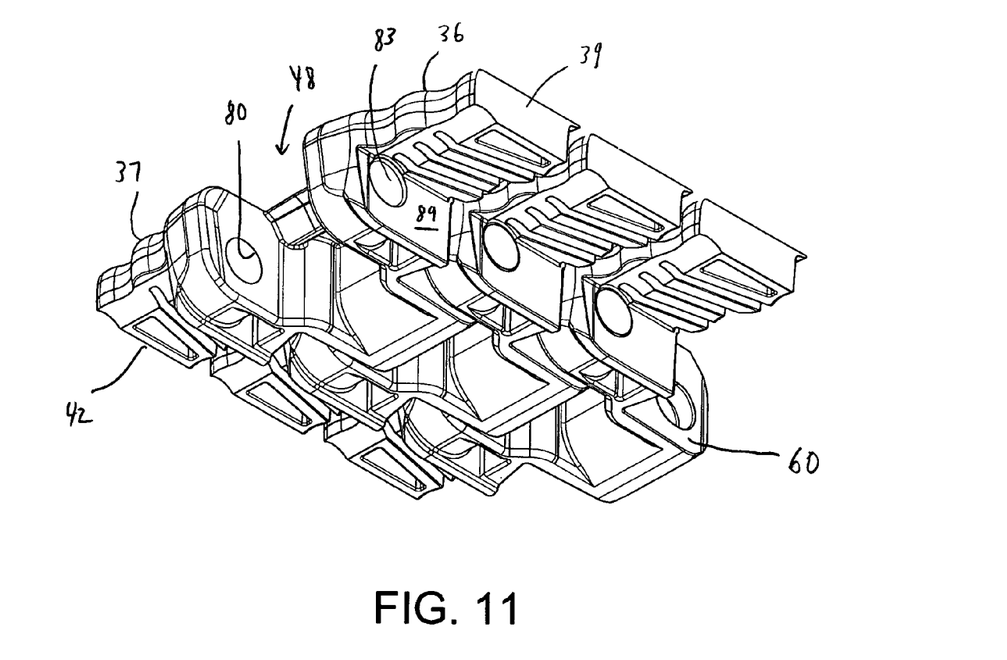
FIG. 11 is another perspective view of a straight running chain of the present invention.
Figure 12:
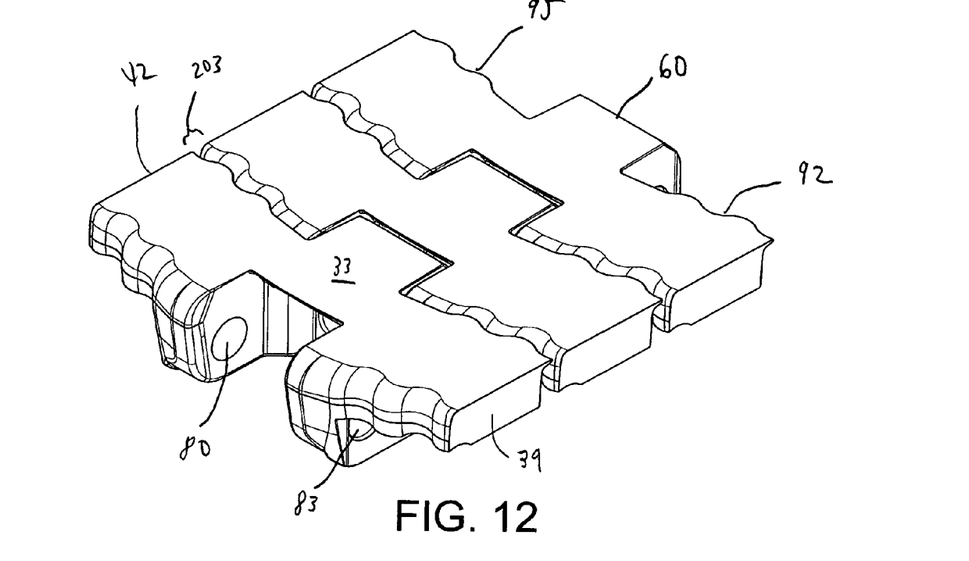
FIG. 12 is another perspective view of a straight running chain of the present invention.
Figure 13:
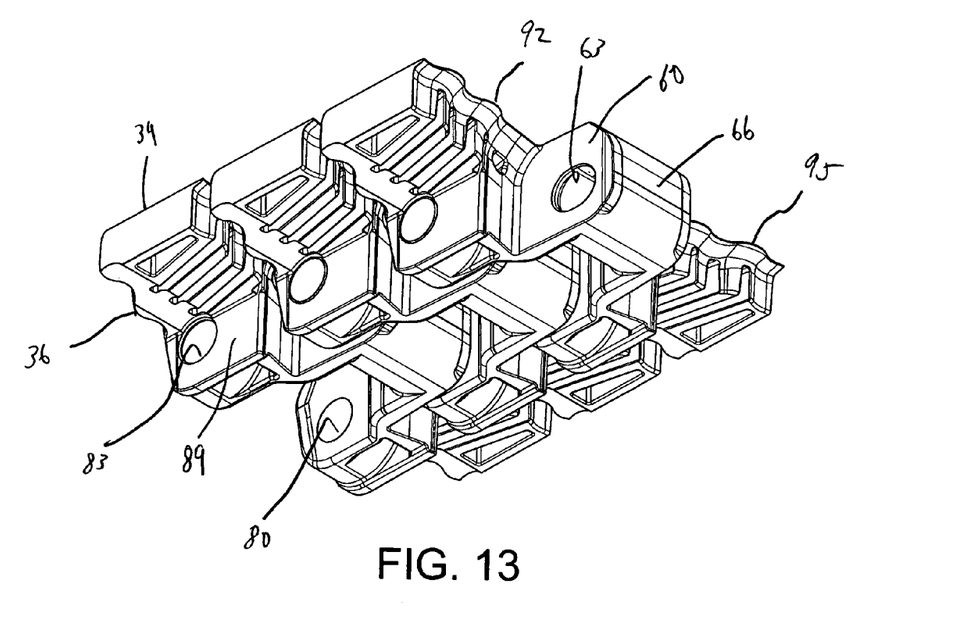
FIG. 13 is another perspective view of a straight running chain of the present invention.
Figure 14:
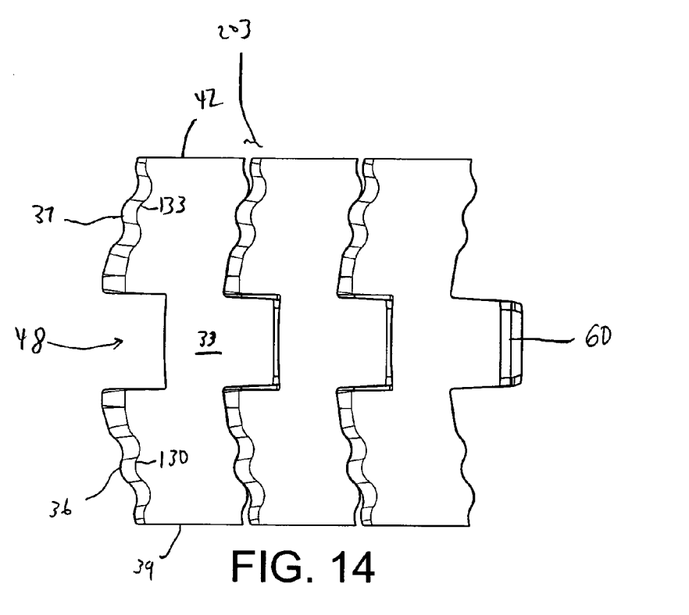
FIG. 14 is a top plan view of a straight running chain of the present invention.
Figure 15:
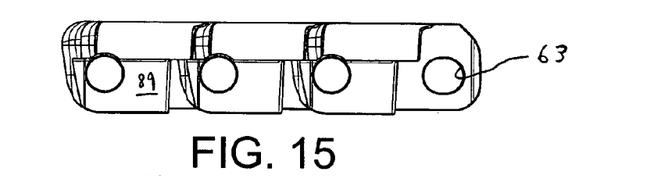
FIG. 15 is a side elevational view of a straight running chain of the present invention.
Figure 16:
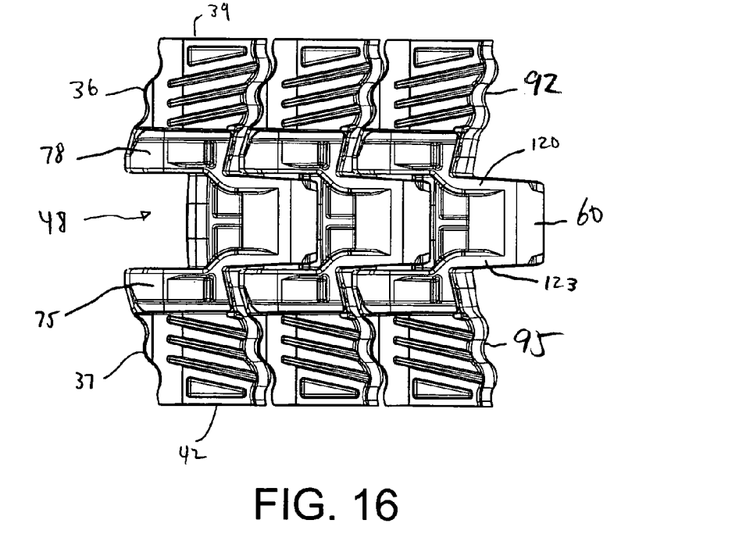
FIG. 16 is a bottom plan view of a straight running chain of the present invention.
Figure 17:
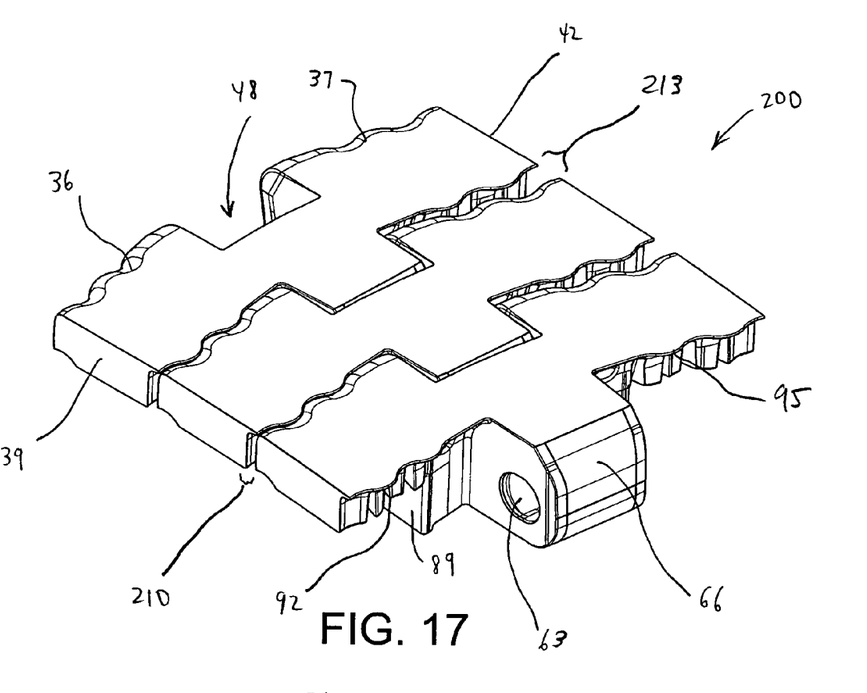
FIG. 17 is a perspective view of a portion of a chain of the present invention negotiating a curve.

In FIG. 7, the bottom of the chain module 30 is shown. First hinge eyes 75 and 78 are spaced apart and divided by opening 48 defined in the module 30. Opening 48 receives the second hinge eye 60 when adjacent modules are attached by a pivot pin. The bottom of the first hinge eyes 75, 78 are connected to the bottom of the second hinge eye 60 by means of connecting members.

Turning to FIGS. 10-16, a portion of a chain 200 suitable for conveying bottles or the like is formed by connecting a plurality of the chain modules 30 in a series in the direction of axis 98. As shown, the chain 200 is running in a straight line and the spaces 203 between adjacent modules 30 are substantially uniform. The leading edges 36, 37 and trailing edges 92, 95 are capable of nesting such that a substantially level conveying surface 33 is provided with gaps between adjacent chain modules minimized.

Figure 18:
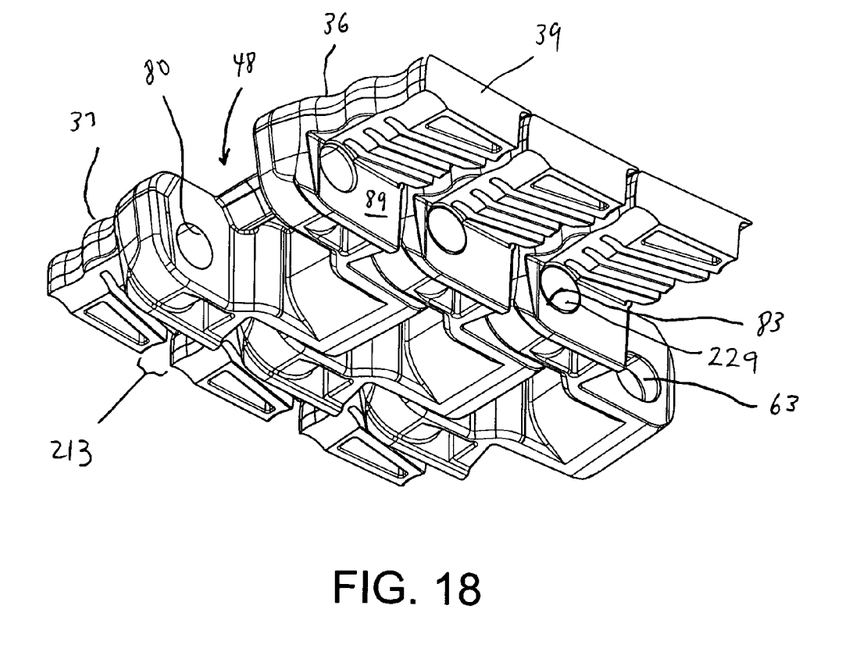
FIG. 18 is another perspective view of a chain of the present invention negotiating a curve.
Figure 19:
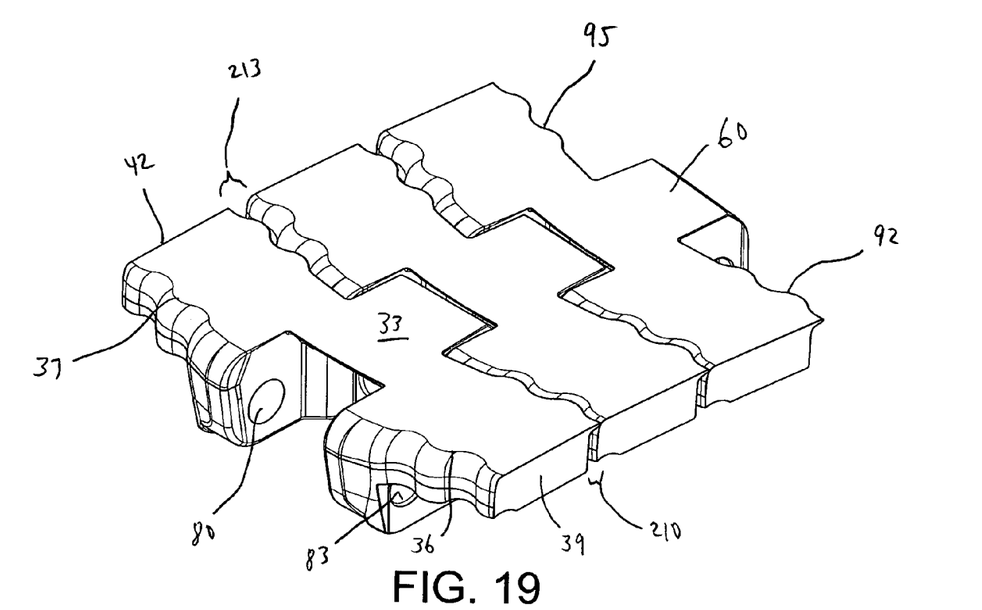
FIG. 19 is another perspective view of a chain of the present invention negotiating a curve.
Figure 20:
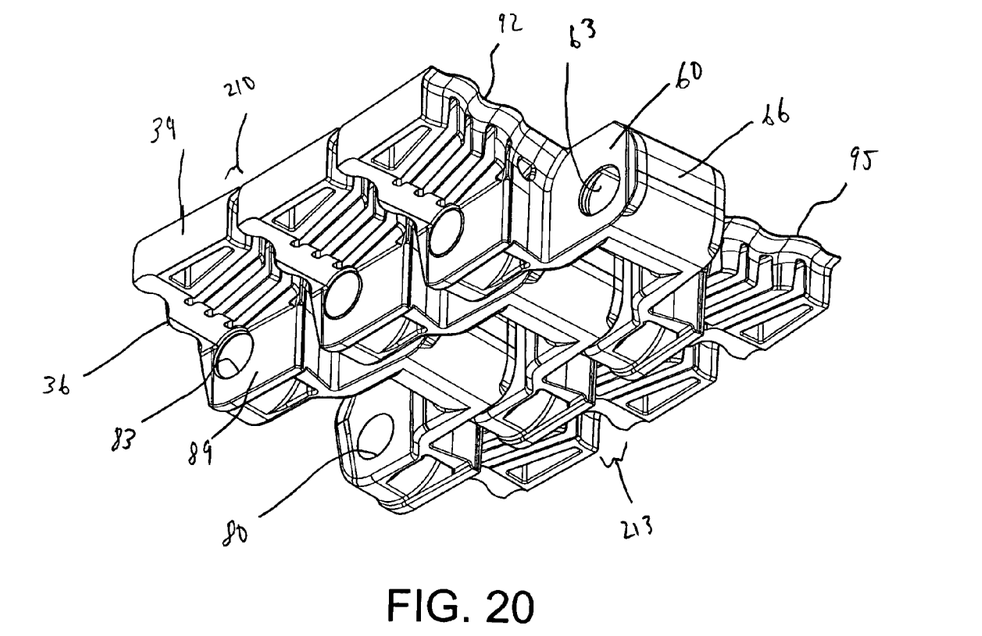
FIG. 20 is another perspective view of a chain of the present invention negotiating a curve.
Figure 21:
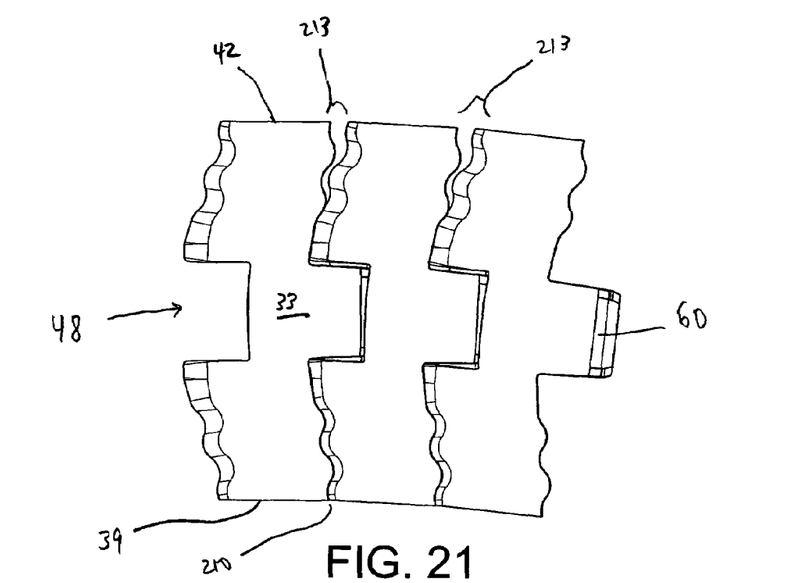
FIG. 21 is a top plan view of a chain of the present invention negotiating a curve.
Figure 22:
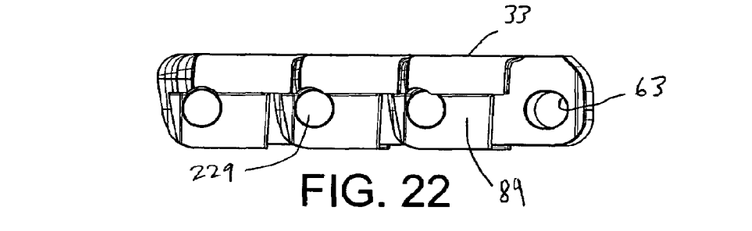
FIG. 22 is a side elevational view of a chain of the present invention negotiating a curve; and, FIG. 23 is a bottom plan view of a chain of the present invention negotiating a curve.
Figure 23:
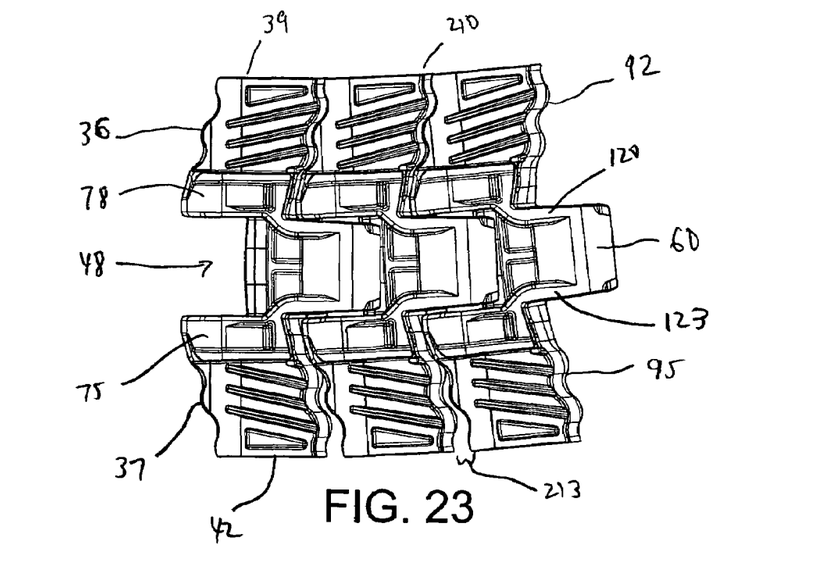

In FIGS. 17-23, a portion of the chain 200 is shown as it negotiates a curve. As shown on the left hand side of FIG. 17, the side edges 39 are collapsed together at the inside of the curve on the left side of the chain 200. The side edges 42 are placed apart as they "fan" out at the outside of the curve as shown on the right hand side of FIG. 17. As shown, a space 210 between the left hand side of the modules 30 is smaller than the space 213 at the right hand side. As shown in FIG. 18, adjacent chain modules 30 are pivotally connected by pivot rods 229 that pass through the aligned transverse openings 63, 80 and 83 of adjacent chain modules 30. The serpentine or sinusoidal arrangement of the peaks and valleys on the leading edges and trailing edges of adjacent chain modules minimizes the gap between adjacent chain modules to provide for a smoother conveying surface especially when the chain 200 is negotiating turns. Accordingly, the chain 200 may be used for high speed conveying of bottles or cans without causing them to tip over.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A chain module, comprising:
   an upper conveying surface extending from a first side edge to a second side edge, the upper conveying surface having an opening defined therein for receiving a projecting portion of an adjacent chain module, the opening extending to the bottom of the chain module and capable of receiving the projecting portion of an adjacent module for pivotally connecting adjacent chain modules with a pivot rod, the upper conveying surface having a top edge connected to a leading edge by a curved portion and having a trailing edge, the leading edge having a first portion and a second portion separated by the opening, the trailing edge having a first portion and a second portion separated by the projecting portion, the projecting portion extending from the upper conveying surface to the bottom of the chain module;
   a pair of opposed first hinge eyes extending from the upper conveying surface and disposed in spaced apart relation on opposite sides of the opening, each hinge eye having a transverse pivot rod opening;
   a second hinge eye disposed in the projecting portion and having a transverse pivot rod opening, the transverse pivot rod opening in the second hinge eye capable of aligning with the transverse pivot rod openings in the first hinge eyes of an adjacent chain module;
   wherein the top edge, leading edge, and the trailing edge are defined by a plurality of alternating peaks and valleys, the peaks and valleys being offset such that the peaks on the trailing edge align with the valleys on the leading edge of an adjacent chain module.

2. The chain module of claim 1, further comprising guiding surfaces disposed on the opposed first hinge eyes.

3. The chain module of claim 1, further comprising a pair of opposed cantilevered wings extending from opposite sides of the module.

4. The chain module of claim 1, further comprising a curved portion extending from the trailing edge toward the bottom of the chain module.

5. The chain module of claim 1, wherein the module has a curved edge extending from the projecting portion.

6. The chain module of claim 1, wherein a bottom surface of the module comprises a plurality of grooves.

7. The chain module of claim 1, wherein the bottom of the first hinge eyes is substantially coplanar with the bottom of the second hinge eye.

8. The chain module of claim 1, wherein the transverse pivot rod openings in the second hinge eye are oval-shaped.

9. The chain module of claim 1, wherein the transverse pivot rod openings in the first hinge eyes are circular.

10. The chain module of claim 1, wherein the first hinge eyes are connected to the second hinge eyes by a connecting member.

11. The chain module of claim 1, wherein the alternating peaks and valleys form a sinusoidal curve.

12. A conveying chain, comprising:
    a plurality of chain modules having an upper conveying surface extending from a first side edge to a second side edge, the upper conveying surface having an opening defined therein for receiving a projecting portion of an adjacent chain module, the opening extending to the bottom of the chain module and capable of receiving the projecting portion of an adjacent module for pivotally connecting adjacent chain modules with a pivot rod, the upper conveying surface having a top edge connected to a leading edge by a curved portion and having a trailing edge, the leading edge having a first portion and a second portion separated by the opening, the trailing edge having a first portion and a second portion separated by the projecting portion, the projecting portion extending from the upper conveying surface to the bottom of the chain module;
    a pair of opposed first hinge eyes extending from the upper conveying surface and disposed in spaced apart relation on opposite sides of the opening, each hinge eye having a transverse pivot rod opening;
    a second hinge eye disposed in the projecting portion and having a transverse pivot rod opening, the transverse pivot rod opening in the second hinge eye capable of aligning with the transverse pivot rod openings in the first hinge eyes of an adjacent module;
    wherein the top edge, leading edge and the trailing edge are defined by a plurality of alternating peaks and valleys, the peaks and valleys being offset such that the peaks on the trailing edge align with the valleys on the leading edge of an adjacent module such that gaps between adjacent chain modules are minimized while the chain negotiates a turn;
    a plurality of pivot rods disposed through the aligned openings in the first and second hinge eyes of adjacent chain modules.

13. The chain module of claim 12, further comprising guiding surfaces disposed on the opposed first hinge eyes.

14. The chain module of claim 12, further comprising a pair of opposed cantilevered wings extending from opposite sides of the module.

15. The chain module of claim 12, further comprising a curved portion extending from the trailing edge toward the bottom of the chain module.

16. The chain module of claim 12, wherein the module has a curved edge extending from the projecting portion.

17. The chain module of claim 12, wherein a bottom surface of the module comprises a plurality of grooves.

18. The chain module of claim 12, wherein the bottom of the first hinge eyes is substantially coplanar with the bottom of the second hinge eye.

19. The chain module of claim 12, wherein the transverse pivot rod openings in the second hinge eye are oval-shaped.

20. The chain module of claim 12, wherein the transverse pivot rod openings in the first hinge eyes are circular.

21. The chain module of claim 12, wherein the first hinge eyes are connected to the second hinge eyes by a connecting member.

22. The chain module of claim 12, wherein the alternating peaks and valleys form a sinusoidal curve.

23. A method of forming a conveying chain, comprising:

providing a plurality of chain modules having an upper conveying surface extending from a first side edge to a second side edge, the upper conveying surface having an opening defined therein for receiving a projecting portion of an adjacent chain module, the opening extending to the bottom of the chain module and capable of receiving the projecting portion of an adjacent module for pivotally connecting adjacent chain modules with a pivot rod, the upper conveying surface having a top edge connected to a leading edge by a curved portion and having a trailing edge, the leading edge having a first portion and a second portion separated by the opening, the trailing edge having a first portion and a second portion separated by the projecting portion, the projecting portion extending from the upper conveying surface to the bottom of the chain module, the modules having a pair of opposed first hinge eyes extending from the upper conveying surface and disposed in spaced apart relation on opposite sides of the opening, each hinge eye having a transverse pivot rod opening, the modules having a second hinge eye disposed in the projecting portion and having a transverse pivot rod opening, the transverse pivot rod opening in the second hinge eye capable of aligning with the transverse pivot rod openings in the first hinge eyes of an adjacent module, and wherein the top edge, leading edge, and the trailing edge are defined by a plurality of alternating peaks and valleys, the peaks and valleys being offset such that the peaks on the trailing edge align with the valleys on the leading edge of an adjacent module such that gaps between adjacent chain modules are minimized while the chain negotiates a turn;

inserting a plurality of pivot rods through the aligned openings in the first and second hinge eyes of adjacent chain modules in order to form a chain.

* * * * *